(12) United States Patent
Hunt et al.

(10) Patent No.: US 8,809,761 B1
(45) Date of Patent: Aug. 19, 2014

(54) FREQUENCY SELECTIVE SENSOR SYSTEM

(75) Inventors: Jeffrey H. Hunt, Thousang Oaks, CA (US); John Huntley Belk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 13/286,862

(22) Filed: Nov. 1, 2011

(51) Int. Cl.
 *H01J 40/14* (2006.01)
(52) U.S. Cl.
 USPC ..................................... 250/214 R
(58) Field of Classification Search
 USPC .............. 250/214 R, 214.1; 244/3.13–3.17
 See application file for complete search history.

(56) References Cited

U.S. PATENT DOCUMENTS

| | | | |
|---|---|---|---|
| 2002/0080061 A1* | 6/2002 | Secker | 342/62 |
| 2004/0021062 A1* | 2/2004 | Zaidi | 250/214 R |
| 2007/0084505 A1* | 4/2007 | Zaidi | 136/256 |

OTHER PUBLICATIONS

Huber, et al., "Confinement Effects and Surface-Induced Charge Carriers in Bi Quantum Wires," Applied Physics Letters, Feb. 23, 2004, pp. 1326-1328, vol. 84, No. 8.
Heremans, et al., "Thermoelectric Power of Bismuth Nanocomposites," Physical Review Letters, May 27, 2002, pp. 216801-1 to 216801-4, vol. 88, No. 21.
Peleg, et al., "Omnistereo: Panoramic Stereo Imaging," IEEE Transactions on Pattern Analysis and Machine Intelligence, Mar. 2001, pp. 279-290, vol. 23, No. 3.

* cited by examiner

*Primary Examiner* — Seung C Sohn
(74) *Attorney, Agent, or Firm* — Yee & Associates, P.C.

(57) ABSTRACT

A method and apparatus for processing light. An apparatus comprises a light collector and a wire. The light collector is configured to receive light and direct the light to a location. The wire is in the location and is configured to generate an electrical signal in response to a number of photons of the light absorbed by the wire. The electrical signal generated by the wire includes information about a frequency of the number of photons.

20 Claims, 8 Drawing Sheets

FREQUENCY SELECTIVE SENSOR SYSTEM

BACKGROUND INFORMATION

1. Field

The present disclosure relates generally to sensors and, in particular, to sensor systems for detecting the movement of objects.

2. Background

Missile defense includes detecting, tracking, and neutralizing missiles. Missile defense may be especially useful for surface ships. When surface ships are near the shore, missile launches may pose dangers to the surface ships.

Sensor systems are used to detect missile launches. The sensor systems may be carried by aircraft. The aircraft may perform reconnaissance missions to detect missile launches. In performing these types of missions, the aircraft has telescopes that are configured for use in detecting missile launches. These telescopes are moveable, mounted, and frequently operated by human operators.

Additionally, ships may scan the horizon using telescopes to look for incoming missiles that may skim the surface of the water. These types of telescopes have a limited field of view. As a result, the number of telescopes needed to provide a preferred coverage and number of operators to operate the telescopes may be greater than desired. Because of their narrow field of view, telescopes may miss launches at the moment they occur, reducing the amount of response time to the launch.

Other sensor systems may include forward looking infrared (FLIR) sensors. These types of sensors detect heat to generate an image. These sensors may include cameras that detect infrared light. The sensors may include various components such as filters, cryogenic cooling, and complex arrays of detectors. These sensors also are movably mounted because of the limited fields of view. With the increased complexity and the presence of moveable parts, the maintenance that may be needed for these sensor systems may be greater than desired.

Therefore, it would be advantageous to have a method and apparatus that takes into account at least some of the issues discussed above as well as possibly other issues.

SUMMARY

In one advantageous embodiment, an apparatus comprises a light collector and a wire. The light collector is configured to receive light and direct the light to a location. The wire is in the location and is configured to generate an electrical signal in response to a number of photons of the light absorbed by the wire. The electrical signal generated by the wire includes information about a frequency of the number of photons.

In another advantageous embodiment, a sensor system comprises a plurality of wires, a light collector, and an analyzer. The plurality of wires each are configured to generate an electrical signal in response to a number of photons absorbed by the plurality of wires. The electrical signals generated by the plurality of wires include information about a frequency of the number of photons. The light collector is configured to receive light and direct the light toward the plurality of wires. The analyzer is configured to identify a number of frequencies in the light from the electrical signals generated by the plurality of wires.

In still another advantageous embodiment, a method is present for processing light. The light is directed to a location using a light collector. An electrical signal is generated using a wire at the location in response to a number of photons in the light absorbed by the wire, wherein the electrical signal has information about a frequency of the number of photons. The frequency of the number of photons from the electrical signal is identified using an analyzer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account one or more considerations. For example, the different advantageous embodiments recognize and take into account that infrared detectors detect a broad spectrum of frequencies. As a result, forward looking infrared (FLIR) sensors include filtering optics to discriminate between ambient light and light that may be generated by a missile. The different advantageous embodiments also recognize and take into account that this type of approach may have a longer response time than desired.

The different advantageous embodiments also recognize and take into account that currently used detectors operate with a narrow field of view. This narrow field of view occurs because the sensitivity of the detector to the amplitude of the light is typically not great enough to detect a signature that may be useful for determining whether a missile is present.

Thus, the different advantageous embodiments provide a method and apparatus for detecting light, such as infrared light, generated by a missile. Additionally, an advantageous embodiment includes a sensor that is configured to detect a missile at light levels that are lower than are detectable using currently available sensor systems.

In particular, an apparatus includes a light collector and a wire. The light collector is configured to receive light and direct the light to a location in which the wire is located. The wire has a diameter configured to generate an electrical signal in response to a number of photons of the light impinging on and absorbed by the wire. The signal is generated based on the energy and the frequency of the photons. The signal generated by the wire includes information about a frequency of the number of photons. In these illustrative examples, the wire may be implemented using a nanowire.

Figure 1:
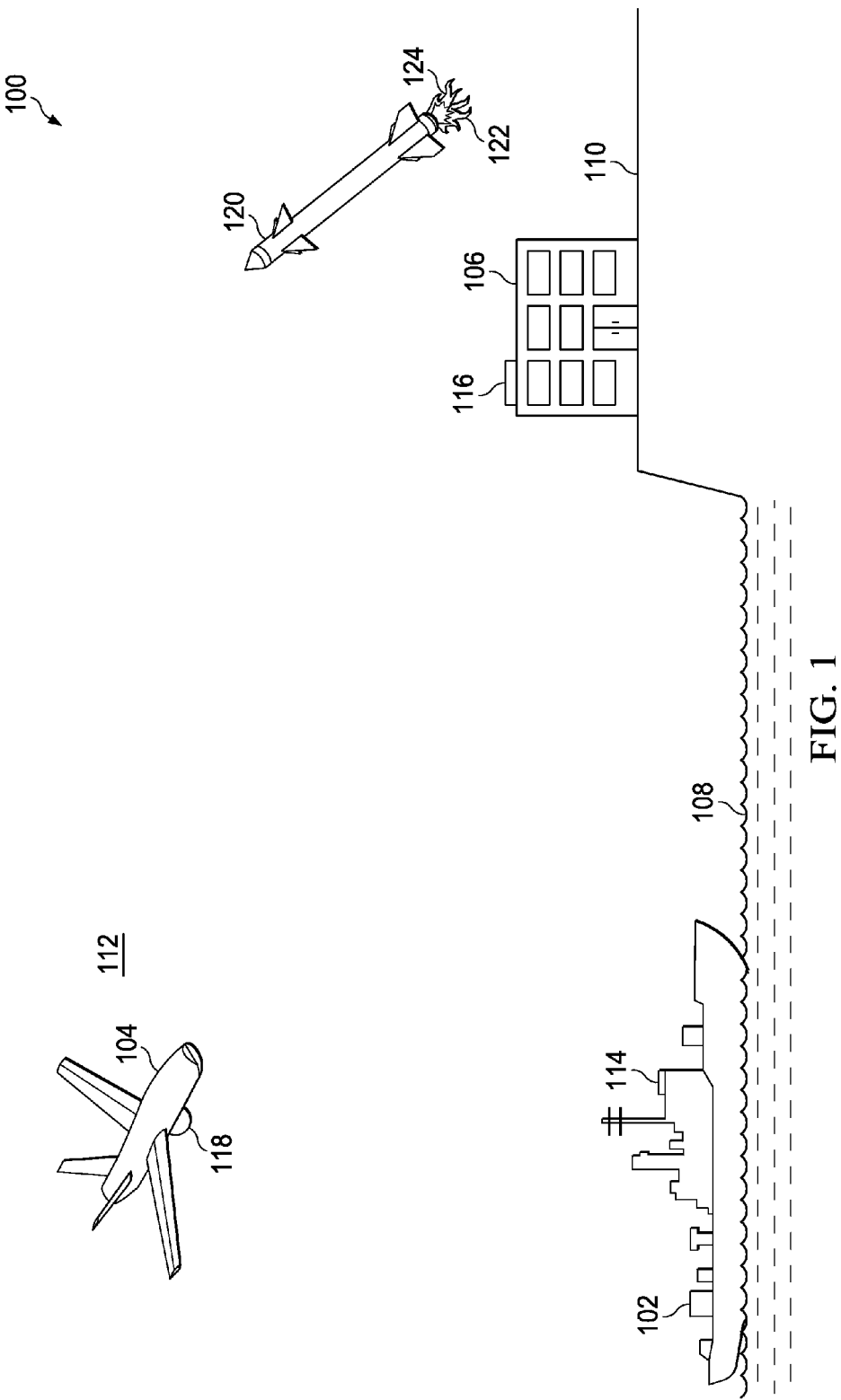
FIG. 1 is an illustration of a sensor environment in accordance with an advantageous embodiment.

Turning now to FIG. 1, an illustration of a sensor environment is depicted in accordance with an advantageous embodiment. In this illustrative example, sensor environment 100 includes ship 102, aircraft 104, and ground station 106. Ship 102 is on water 108. Ground station 106 is located on ground 110, while aircraft 104 flies through air 112.

In these illustrative examples, ship 102 has sensor system 114, ground station 106 has sensor system 116, and aircraft 104 has sensor system 118. These sensor systems are configured to detect objects. In particular, these sensor systems are configured to detect missile 120.

Sensor system 114, sensor system 116, and sensor system 118 may be implemented in accordance with an advantageous embodiment. In these illustrative examples, these sensor systems are configured to detect electromagnetic radiation generated by missile 120. In particular, these sensor systems are configured to detect light 122 from flame 124 of missile 120. Light 122 may be visible light, infrared light, or a combination of the two.

The different advantageous embodiments recognize and take into account that in the spectrum of wavelengths, dark ranges known as Fraunhofer lines are present. Fraunhofer lines are spectral absorption lines present in the solar spectrum. The dark lines are caused by the presence of cold gases at the outer edges of the solar atmosphere. These dark lines are produced whenever a cold gas is between a broad spectrum photon source and a detector. In this case, the decrease in the intensity of the light in the frequency of the photon is seen as the photons are absorbed and readmitted in random directions. Looking for signals in these solar dark regions will give enhanced signal to background ratios, enhancing the ability of launch detection.

In contrast, when a glowing gas is present, such as light 122 generated by flame 124 of missile 120, the photons from the glowing gas may be admitted in a narrow frequency range generated by gases that have a particular temperature corresponding to those from a rocket engine. In these illustrative examples, the light from a rocket engine is brighter than the surrounding background.

The sensor systems in the illustrative examples do not need optical elements to filter light 122. Instead, this difference in intensity is present in information in signals generated by wires, such as nanowires, located in a sensor array in a sensor system. The signals generated by the sensor array may be processed to identify frequencies that correspond to light 122 from a rocket engine in missile 120. Many frequency spectral emissions are present with a rocket engine that is operating. A desired signal to background detection occurs in the solar dark spectral regions. As a result, these spectral regions may be selected for use in performing detections.

Figure 2:
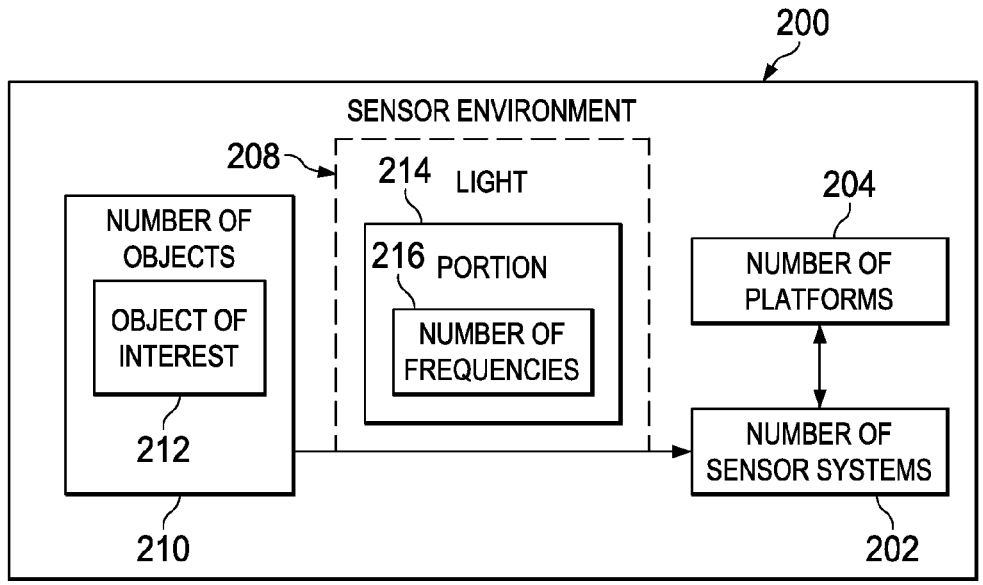
FIG. 2 is an illustration of a block diagram of a sensor environment in accordance with an advantageous embodiment.

Turning next to FIG. 2, an illustration of a block diagram of a sensor environment is depicted in accordance with an advantageous embodiment. Sensor environment in FIG. 1 is an example of an implementation for sensor environment 200 shown in block form in FIG. 2.

As depicted, sensor environment 200 includes number of sensor systems 202 associated with number of platforms 204. As used herein, a "number", when used with reference to items, means one or more items. For example, number of sensor systems 202 is one or more sensor systems.

The association between number of sensor systems 202 and number of platforms 204 is a physical association in these depicted examples. A first component, such as a sensor system in number of sensor systems 202, may be considered to be associated with a second component, such as a platform in number of platforms 204, by being secured to the second component, bonded to the second component, mounted to the second component, welded to the second component, fastened to the second component, and/or connected to the second component in some other suitable manner. The first component also may be connected to the second component using a third component. The first component also may be considered to be associated with the second component by being formed as part of and/or an extension of the second component.

Number of platforms 204 may take a number of different forms. For example, without limitation, a platform within number of platforms 204 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, a building, and other suitable structures or vehicles.

In these illustrative examples, number of sensor systems 202 is configured to detect light 208 generated by number of objects 210. In these illustrative examples, number of sensor systems 202 is frequency selective. In other words, number of sensor systems 202 may be used to identify particular frequencies or wavelengths when detecting light 208. These frequencies may be selected for object of interest 212 in number of objects 210.

In other words, object of interest 212 generates portion 214 of light 208 having number of frequencies 216 of light 208. Number of frequencies 216 may be selected from all of the frequencies in portion 214 of light 208 generated by object of interest 212 as one or more frequencies that may be unique to object of interest 212. As a result, when number of frequencies 216 is detected in light 208, object of interest 212 may be identified as being present in sensor environment 200.

In these illustrative examples, number of sensor systems 202 may identify the presence of number of objects 210, identify what type of objects that number of objects 210 are, and identify events that may be occurring with respect to number of objects 210.

For example, number of sensor systems 202 may identify object of interest 212 as a missile that has been launched. In another example, number of sensor systems 202 may identify object of interest 212 as a missile that is traveling over the water. In yet another example, number of sensor systems 202 may identify object of interest 212 as being a spacecraft re-entering the atmosphere. In yet another example, number of sensor systems 202 may identify object of interest 212 as an aircraft taking off.

In these illustrative examples, object of interest 212 may be identified as being present in number of objects 210 when light 208 is detected as having number of frequencies 216 for object of interest 212.

Figure 3:
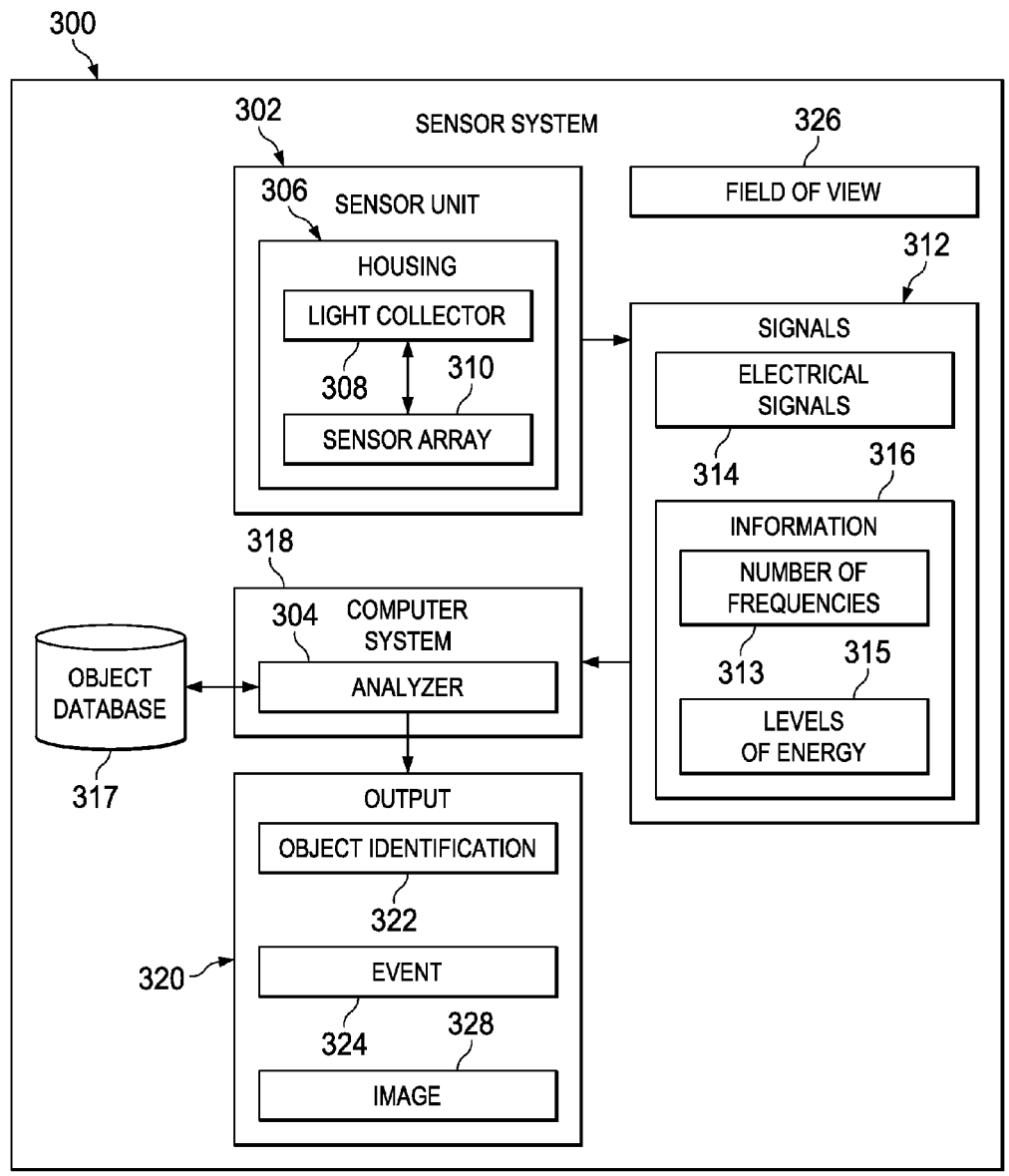
FIG. 3 is an illustration of a block diagram of a sensor system in accordance with an advantageous embodiment.

With reference next to FIG. 3, an illustration of a block diagram of a sensor system is depicted in accordance with an advantageous embodiment. Sensor system 300 is an example of a sensor system that may be in number of sensor systems 202 in FIG. 2.

Sensor system 300 includes sensor unit 302 and analyzer 304. As depicted, sensor unit 302 comprises housing 306, light collector 308, and sensor array 310. Light collector 308 and sensor array 310 are associated with housing 306. In these illustrative examples, light collector 308 comprises hardware and is configured to direct light 208 in FIG. 2 toward sensor array 310.

Sensor array 310 comprises hardware and is configured to generate signals 312 in response to receiving light 208. In these illustrative examples, signals 312 are electrical signals 314 and include information 316. Information 316 includes information about number of frequencies 313 for light 208. Information 316 also includes information about levels of energy 315 for light 208. Levels of energy 315 may be measured as intensities for light 208.

In these illustrative examples, analyzer 304 is connected to sensor array 310. Analyzer 304 may be implemented using hardware, software, or a combination of the two. In these illustrative examples, analyzer 304 may be implemented in computer system 318. Computer system 318 is comprised of one or more computers. When more than one computer is present, those computers may be in communication with each other using a medium such as wireless communications links, a local area network, or some other suitable medium.

Analyzer 304 is configured to process information 316 in signals 312 to identify whether objects are present. Further, if objects are present, other information about the objects may be identified. This processing may be used to generate output 320. Output 320 may take a number of different forms. For example, without limitation, output 320 may be at least one of an indication on a display device, an email message, a voice message, and other suitable forms of output. Output 320 may then be used by any suitable application, person, or other entity.

As depicted, output 320 includes at least one of image 328, object identification 322, and event 324. For example, object identification 322 may be an identification of a particular object, and event 324 may indicate an action or event relating to object identification 322. Object identification 322 may identify, for example, without limitation, an object such as a missile, an aircraft, a vehicle, a spacecraft, a launch vehicle, and other suitable objects. In some illustrative examples, the object identified may not be a vehicle but may be another platform.

Event 324 may be identified based on, for example, a movement of the object identified. The movement of the object may indicate that a launch has occurred, the object is in flight, the object is landing, or other events.

In the illustrative examples, analyzer 304 may be selective in processing signals 312. For example, analyzer 304 may search for one or more particular frequencies in number of frequencies 313. These particular frequencies may be frequencies associated with objects that analyzer 304 is configured to identify.

For example, analyzer 304 may compare number of frequencies 313 identified for light 208 with object database 317. Object database 317 may include frequencies that are associated with objects to be identified by analyzer 304. These frequencies may be a signal frequency for the object or a pattern of frequencies for the object. Further, patterns of frequencies may be present in object database 317 that may identify an event associated with a particular object. For example, an object in the form of a launch vehicle may have one set of frequencies when the launch vehicle has just been launched, and a second set of frequencies when the launch vehicle is in flight.

In these illustrative examples, sensor system 300 has field of view 326. Field of view 326 may be, for example, about 360 degrees, depending on the configuration of sensor array 310. Of course, field of view 326 may have other values depending on the particular implementation. For example, field of view 326 may be about 180 degrees, 270 degrees, 40 degrees, or some other desired field of view. Field of view 326 may be achieved without moving parts in sensor system 300.

Figure 4:
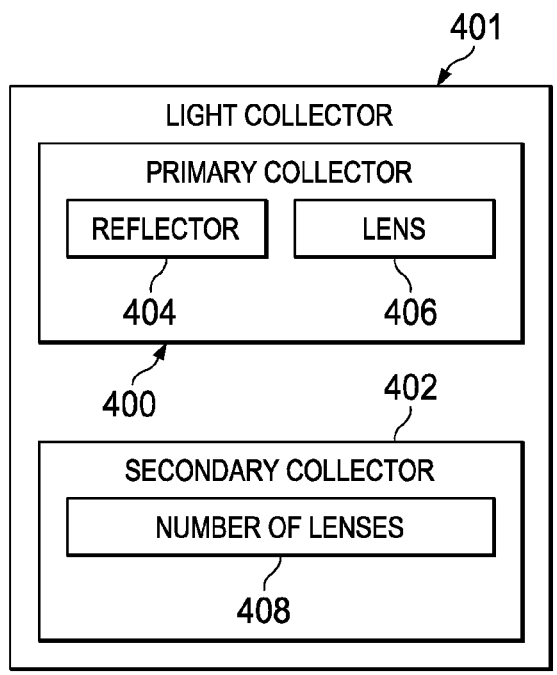
FIG. 4 is an illustration of a block diagram of a light collector in accordance with an advantageous embodiment.

With reference now to FIG. 4, an illustration of a block diagram of a light collector is depicted in accordance with an advantageous embodiment. In this depicted example, light collector 401 may include primary collector 400 and secondary collector 402.

Primary collector 400 is configured to gather light from around the environment and direct the light toward secondary collector 402. Primary collector 400 may be implemented using at least one of reflector 404 and lens 406.

Secondary collector 402 may be implemented using number of lenses 408. Number of lenses 408 in secondary collector 402 receives the light directed by primary collector 400 and directs the light toward sensor array 310 in FIG. 3.

Figure 5:
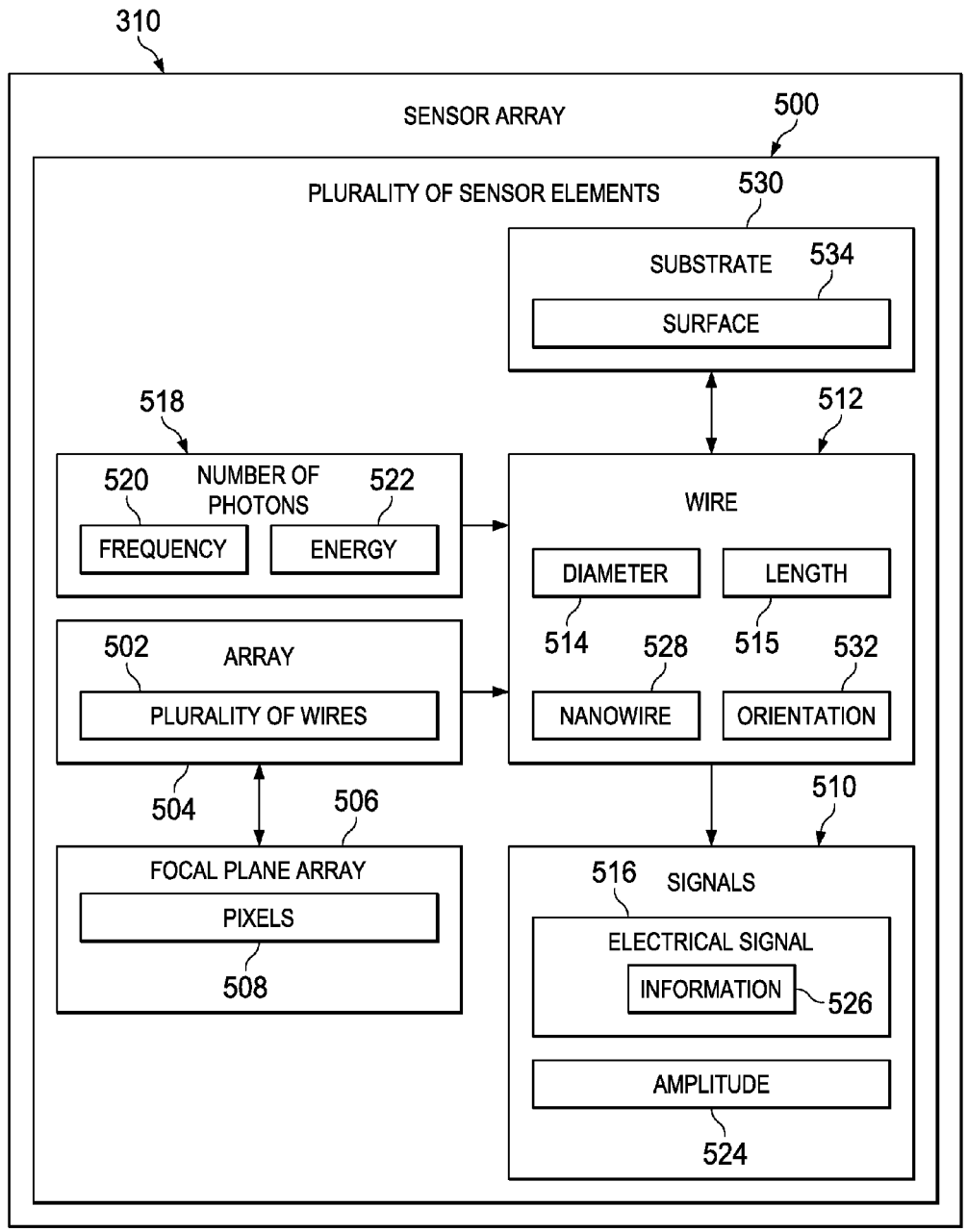
FIG. 5 is an illustration of a block diagram of a sensor array in accordance with an advantageous embodiment.

Turning now to FIG. 5, an illustration of a block diagram of a sensor array is depicted in accordance with an advantageous embodiment. In this illustrative example, sensor array 310 in FIG. 5 comprises plurality of sensor elements 500. In these illustrative examples, plurality of sensor elements 500 takes the form of plurality of wires 502 arranged in array 504. Each sensor element in plurality of sensor elements 500 has a number of wires from plurality of wires 502.

In these illustrative examples, array 504 may have various configurations. For example, array 504 may be focal plane array 506 in which plurality of wires 502 is arranged on a plane in focal plane array 506. In this manner, plurality of sensor elements 500 may correspond to pixels 508 for focal plane array 506. In other words, one or more wires in plurality of wires 502 may correspond to a pixel in pixels 508 for focal plane array 506. In this manner, signals 510 generated by plurality of wires 502 may be used to generate an image.

As depicted, wire 512 in plurality of wires 502 has diameter 514 and length 515. Diameter 514 is configured to generate electrical signal 516 in response to number of photons 518 encountering wire 512. Length 515 of wire 512 may vary. Length 515 may depend on the material selected for wire 512. In these illustrative examples, length 515 may be about at least 10 times the length of diameter 514.

Wire 512 may be comprised of a material, for example, without limitation, selected from at least one of a thermoelectric material, bismuth telluride, bismuth, silicon, bismuth-antimonide, and other suitable materials that provide desired properties for wire 512. One property includes wire 512 generating electrical signal 516 in response to number of photons 518 being absorbed by wire 512. In particular, wire 512 may generate electrical signal 516 with a voltage that is proportional to the energy in number of photons 518 absorbed by wire 512. With the property, wire 512 is a thermoelectrically active wire.

In these illustrative examples, when wire 512 generates electrical signal 516, characteristics of electrical signal 516 depend on the frequency and energy in number of photons 518. In this manner, electrical signal 516 may carry information about the frequency of number of photons 518. In these illustrative examples, frequency 520 in number of photons 518 is proportional to amplitude 524 of electrical signal 516.

In these illustrative examples, electrical signal 516 includes information 526 about frequency 520 of number of photons 518. Additionally, information 526 may include information about energy 522 for number of photons 518.

More specifically, energy 522 for number of photons 518 is presented by amplitude 524 of electrical signal 516. The frequency for number of photons 518 may be identified using Planck's constant by knowing the energy of number of photons 518. This relation may be described using Planck relation or the Planck-Einstein equation.

Different photon frequencies may be present in photons generally. The voltage level of electrical signal 516 is proportional to energy 522. Thus, with energy 522, frequency 520 can be identified. The size of the voltage signals looked for is typically very small with corresponding small photon arrival rates.

If the intensity of number of photons 518 is too large, the intensity can be attenuated to the linear level of the detector. In such cases, spectral filters can be applied to eliminate frequency confusion. These filters may be much broader than is typically used when spectral notches are needed so that the advantage of the present detector is maintained.

In this illustrative example, diameter 514 of wire 512 may be up to about 1 nanometer. In some cases, diameter 514 may be up to about 10 nanometers depending on the particular implementation. For example, when diameter 514 is about 5 nanometers, length 515 may be greater than or equal to about 50 nanometers. In another example, if diameter 514 is about 50 nanometers, length 515 may be greater than or equal to about 500 nanometers. Of course, other diameters may be used depending on the particular implementation. For example, diameter 514 of wire 512 may be about 1 nanometer, about 65 nanometers, or some other diameter. In these illustrative examples, wire 512 takes the form of nanowire 528.

Further, wire 512 may be associated with substrate 530. Also, wire 512 may have orientation 532 relative to substrate 530. In these illustrative examples, orientation 532 may be substantially perpendicular to surface 534 of substrate 530. In other words, length 515 of wire 512 may be substantially perpendicular to surface 534 of substrate 530. Of course, other orientations may be used depending on the particular implementation. For example, length 515 of wire 512 may be substantially parallel to surface 534 of substrate 530, or at some angle relative to surface 534 of substrate 530.

The illustration of sensor systems in FIGS. 2-5 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, although analyzer 304 is described as being associated with the same platform as sensor unit 302 in FIG. 3, analyzer 304 may be located on a different platform in some illustrative examples. Also, light collector 401 in FIG. 4 may omit secondary collector 402 in some examples. Further, secondary collector 402 also may include a combination of lenses and reflectors rather than just number of lenses 408.

For example, in some illustrative examples, sensor array 310 may comprise only a single wire depending on the particular implementation. Further, in other illustrative examples, analyzer 304 may be in a location remote to light collector 308 and sensor array 310. In yet another example, other types of sensors may be included in sensor array 310 in addition to plurality of wires 502. For example, photodiodes or other detectors also may be included within sensor array 310.

In still another illustrative example, analyzer 304 may be implemented as a circuit or other hardware logic component without using computer system 318. When a circuit is used, analyzer 304 may be associated with housing 306.

Figure 6:
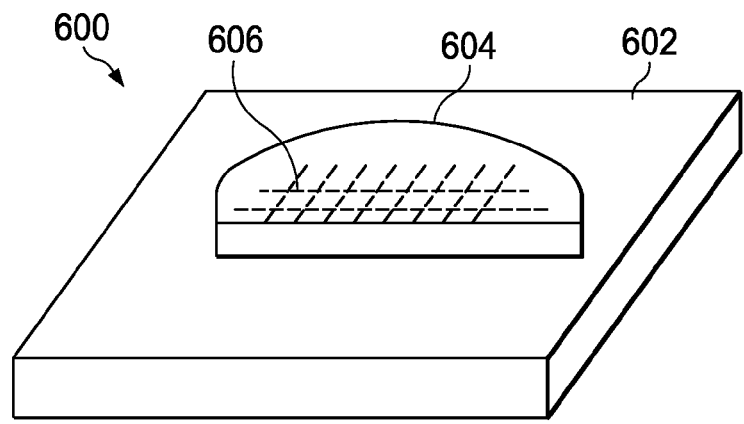
FIG. 6 is an illustration of a sensor system in accordance with an advantageous embodiment.

With reference now to FIG. 6, an illustration of a sensor system is depicted in accordance with an advantageous embodiment. In this depicted example, sensor system 600 is an example of one implementation for sensor system 300 shown in block form in FIG. 3. In this illustrative example, housing 602 for sensor system 600 has light collector 604. Sensor array 606 is an array of sensor elements located within housing 602 under light collector 604. In this illustrative example, light collector 604 is configured to direct light to sensor array 606.

As depicted, sensor system 600 may not include moving parts. Sensor system 600 may be configured to detect objects in a field of view that is substantially 360 degrees.

Figure 7:
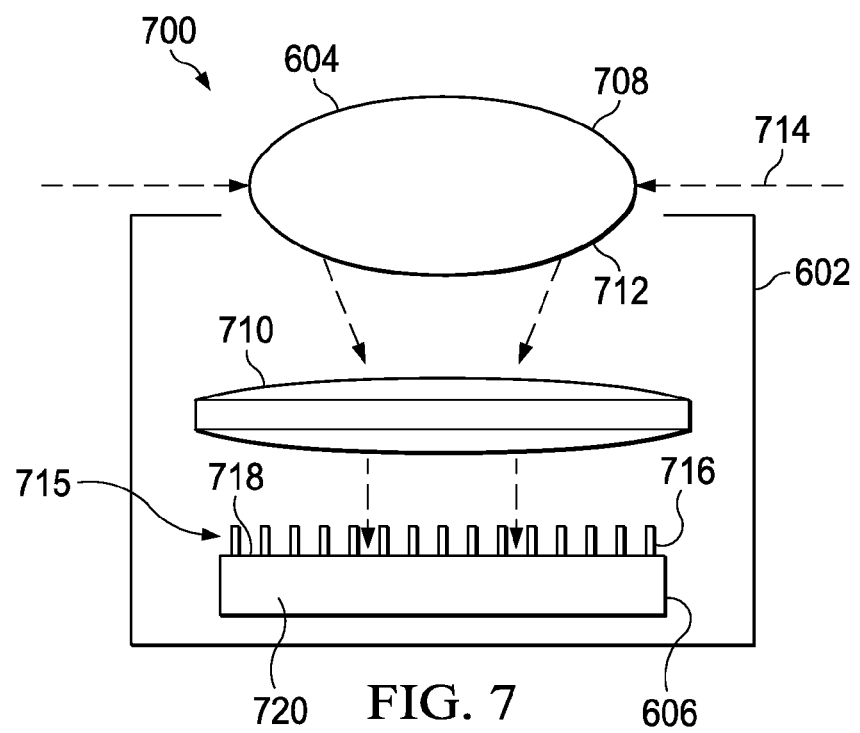
FIG. 7 is an illustration of a sensor system in accordance with an advantageous embodiment.

With reference now to FIG. 7, an illustration of a sensor system is depicted in accordance with an advantageous embodiment. In this illustrative example, sensor system 700 is an example of components that may be located in sensor system 600 in FIG. 6.

In this illustrative example, light collector 604 includes reflector 708 and lens 710. Reflector 708 has reflective surface 712. Reflective surface 712 on reflector 708 directs light 714 to lens 710. Lens 710 focuses light 714 onto sensor array 606. In turn, sensor array 606 generates signals (not shown) in response to detecting light 714.

In this illustrative example, wires 716 form array of sensor elements 715 in sensor array 606 are oriented substantially perpendicular to planar surface 718 of substrate 720. Of course, other orientations may be used depending on the particular implementation.

Figure 8:
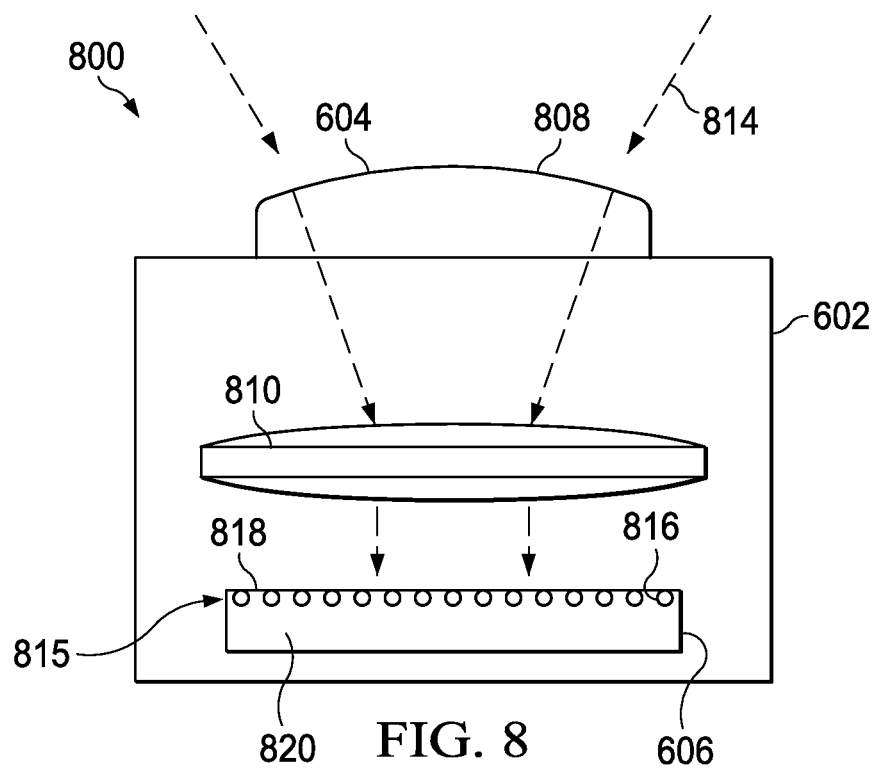
FIG. 8 is another illustration of a sensor system in accordance with an advantageous embodiment.

Turning next to FIG. 8, another illustration of a sensor system is depicted in accordance with an advantageous embodiment. In this illustrative example, components for sensor system 600 in FIG. 6 are depicted in sensor system 800.

As illustrated, light collector 604 comprises lens 808 and lens 810. Lens 808 is a refractive lens in this illustrative example. Lens 808 directs light 814 to lens 810. Lens 810 focuses light 814 onto sensor array 606. Sensor array 606 takes the form of a focal plane array in these illustrative examples. In response to receiving light 814, sensor array 606 generates signals (not shown).

As depicted in this illustrative example, wires 816 form array of sensor elements 815 in sensor array 606 are oriented substantially planar to planar surface 818 of substrate 820. In other words, wires 816 may be co-planar on or lay in channels in planar surface 818. Of course, other orientations may be used depending on the particular implementation.

The different components shown in FIGS. 1, 6, 7, and 8 may be combined with components in FIGS. 2-5, used with components in FIGS. 2-5, or a combination of the two. Additionally, some of the components in FIGS. 1, 6, 7, and 8 may be illustrative of how components shown in block form in FIGS. 2-5 may be implemented as physical structures.

In these illustrative examples, sensor system 300 in FIG. 3 may be of interest for detecting missile launches. With field of view 326 in sensor system 300, sensor system 300 may be able to monitor most of the horizon for a ship or other platform. Further, with field of view 326 for sensor system 300, sensor system 300 is configured to monitor substantially all of the horizon to detect missiles that may be launched.

In these illustrative examples, sensor array 310 generates electrical signals 314 with number of frequencies 313. With number of frequencies 313 based on light 208 in FIG. 2, analyzer 304 is able to examine specific frequencies of interest in light 208. In this manner, analyzer 304 is able to distinguish between signals having wavelengths of interest and those that may be naturally occurring in the background.

Figure 9:
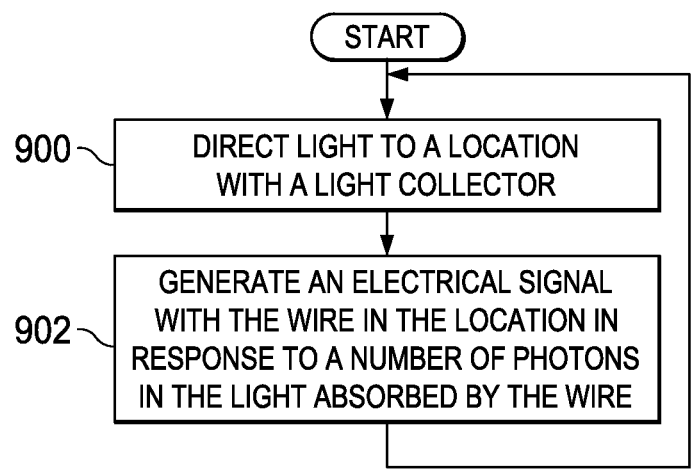
FIG. 9 is an illustration of a flowchart of a process for processing light using a sensor system in accordance with an advantageous embodiment.

Turning now to FIG. 9, an illustration of a flowchart of a process for processing light using a sensor system is depicted in accordance with an advantageous embodiment. The process illustrated in FIG. 9 may be implemented in sensor environment 200 in FIG. 2 to detect number of objects 210. In particular, this process may be implemented in sensor array 310 in sensor system 300 in FIG. 3 to generate electrical signals 314 for analysis in identifying objects of interest in number of objects 210.

The process begins by directing light to a location with a light collector (operation 900). In operation 900, the location is the location of a sensor array within the sensor system. The process then generates an electrical signal with the wire in the location in response to a number of photons in the light absorbed by the wire (operation 902) with the process then returning to operation 900. This absorption of the photons causes the electrical signal to be generated. The electrical signal has information about the photons.

Operation 902 may occur for each wire in the sensor array that encounters photons from the light. In other words, additional electrical signals may be generated by additional wires in the sensor array in the location. These additional electrical signals are generated in response to photons in the light absorbed by the additional wires. As a result, the electrical signals generated by the additional wires include information for the photons absorbed by those additional wires.

Figure 10:
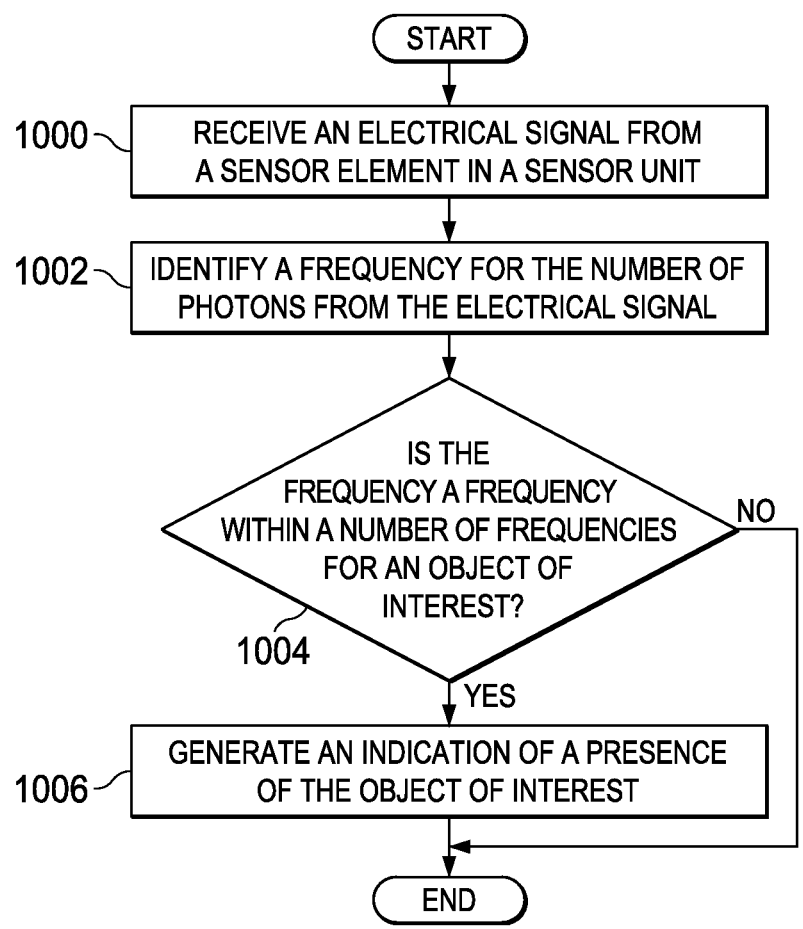
FIG. 10 is an illustration of a flowchart of a process for identifying objects in accordance with an advantageous embodiment.

Turning now to FIG. 10, an illustration of a flowchart of a process for identifying objects is depicted in accordance with an advantageous embodiment. This process may be implemented in sensor system 300 in FIG. 3. In particular, this process may be found in analyzer 304.

The process begins by receiving an electrical signal from a sensor element in a sensor unit (operation 1000). In these illustrative examples, the sensor element may be formed from one or more wires. These wires may take the form of nanowires.

The process identifies a frequency for the number of photons from the electrical signal (operation 1002). The frequency of the photons is based on the frequency of the amplitude of the signal. The energy of the photons is based on the amplitude of the electrical signal. By knowing the energy of the photons, the frequency of the photons may be identified.

A determination is made as to whether the frequency is a frequency within a number of frequencies for an object of interest (operation 1004). If the frequency is a frequency within the number of frequencies, an indication of a presence of the object of interest is generated (operation 1006), with the process terminating thereafter. Otherwise, the process also terminates. The process in this figure may be repeated for each electrical signal received from a sensor unit.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the figures. For example, in some cases, two blocks shown in succession may be executed substantially concurrently or the blocks may sometimes be performed in the reverse order, depending upon the functionality involved. Also, other blocks may be added in addition to the illustrated blocks in a flowchart or block diagram.

Figure 11:
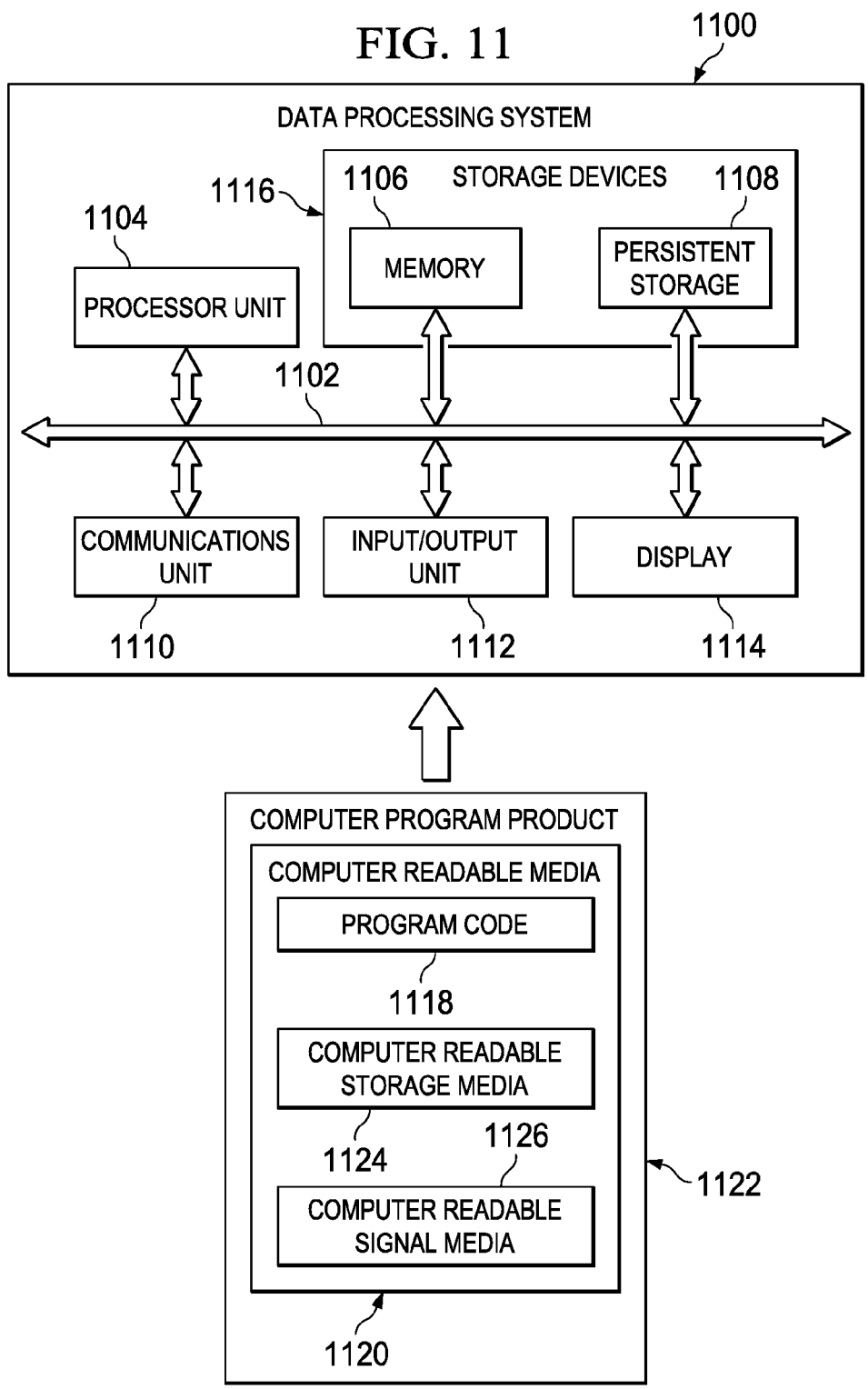
FIG. 11 is an illustration of a data processing system in accordance with an advantageous embodiment.

Turning now to FIG. 11, an illustration of a data processing system is depicted in accordance with an advantageous embodiment. Data processing system 1100 may be used to implement analyzer 304 in FIG. 3. In particular, data processing system 1100 may be used to implement one or more computers in computer system 318 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, data, program code in functional form, and other suitable information. Storage devices 1116 also may be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1100 are not meant to provide physical or architectural limitations to the manner in which different embodiments may be implemented. The different advantageous embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

Thus, one or more advantageous embodiments provide a sensor system configured to detect objects. In one advantageous embodiment, the sensor system provides a desired field of view without requiring moving parts. In other words, the sensor unit does not have to be moved to change the field of view. Further, the sensor system in the illustrative examples may be selective as to frequencies of light that are detected.

In this manner, a sensor system may be configured to detect specific frequencies of light that are generated for a particular type of object. As a result, a greater field of view and selective monitoring for objects, such as a missile or an aircraft, may be performed using fewer resources as compared to currently used systems. With one or more sensor systems configured to change its field of view, in accordance with an advantageous embodiment, fewer sensor systems may be needed to monitor an environment. Additionally, less maintenance also may occur when moving parts are absent.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a light collector configured to receive light and direct the light to a location; and
 a wire in the location, wherein the wire is configured to generate an electrical signal in response to a number of photons of the light absorbed by the wire, wherein the electrical signal generated by the wire includes information about a frequency of the number of photons.

2. The apparatus of claim 1, wherein the wire has a diameter configured to generate the electrical signal in response to the number of photons of the light absorbed by the wire, wherein the electrical signal generated by the wire includes the information about the frequency of the number of photons.

3. The apparatus of claim 1, wherein the wire is configured to generate the electrical signal in response to the number of photons of the light absorbed by the wire, wherein the electrical signal generated by the wire has a voltage that is proportional to the frequency of the number of photons.

4. The apparatus of claim 1 further comprising:
 an analyzer configured to identify the frequency of the number of photons from the electrical signal generated by the wire.

5. The apparatus of claim 4, wherein the analyzer is further configured to identify an intensity of the number of photons from the electrical signal.

6. The apparatus of claim 4, wherein the analyzer is further configured to identify an event using the electrical signal.

7. The apparatus of claim 1, wherein the wire is a sensor element in an array of sensor elements.

8. The apparatus of claim 7, wherein each sensor element in the array of sensor elements corresponds to a pixel.

9. The apparatus of claim 1, wherein the wire has a diameter up to about 10 nanometers.

10. The apparatus of claim 1, wherein the wire is comprised of a material selected from one of a thermoelectric material, bismuth telluride, bismuth, silicon, and bismuth-antimonide.

11. The apparatus of claim 1, wherein the wire is a nanowire.

12. The apparatus of claim 1, wherein the light collector is selected from at least one of a reflector and a lens.

13. The apparatus of claim 6, wherein the event is movement of an object selected from one of a missile, an aircraft, a vehicle, a spacecraft, and a launch vehicle.

14. A sensor system comprising:
 a plurality of wires, wherein the plurality of wires each are configured to generate an electrical signal in response to a number of photons absorbed by the plurality of wires, wherein the electrical signal generated by the plurality of wires includes information about a frequency of the number of photons;
 a light collector configured to receive light and direct the light toward the plurality of wires; and
 an analyzer configured to identify a number of frequencies in the light from the electrical signal generated by the plurality of wires.

15. The sensor system of claim 14, wherein the light collector and the plurality of wires are configured to detect the light in a field of view of about 360 degrees.

16. The sensor system of claim 14, wherein the plurality of wires are nanowires.

17. A method for processing light, the method comprising:
directing the light to a location using a light collector;
generating an electrical signal using a wire at the location in response to a number of photons in the light absorbed by the wire, wherein the electrical signal has information about a frequency of the number of photons; and
identifying the frequency of the number of photons from the electrical signal using an analyzer.

18. The method of claim 17 further comprising:
determining whether the frequency in the information from the electrical signal is a selected frequency for an object of interest; and
generating an indication of a presence of the object of interest when the frequency in the information from the electrical signal is the selected frequency for the object of interest.

19. The method of claim 17, wherein the wire has a diameter configured to generate the electrical signal in response to the number of photons of the light absorbed by the wire, wherein the electrical signal generated by the wire includes the information about the frequency of the number of photons.

20. The method of claim 17, wherein the wire is configured to generate the electrical signal in response to the number of photons of the light absorbed by the wire, wherein the electrical signal generated by the wire has a voltage that is proportional to the frequency of the number of photons.

* * * * *